United States Patent [19]
Burtis

[11] Patent Number: 5,366,116
[45] Date of Patent: * Nov. 22, 1994

[54] GROUT TOOL

[76] Inventor: Warren A. Burtis, 12 Ash Ave., Kentfield, Calif. 94904

[*] Notice: The portion of the term of this patent subsequent to Jun. 29, 2010 has been disclaimed.

[21] Appl. No.: 84,546

[22] Filed: Jun. 29, 1993

Related U.S. Application Data

[63] Continuation-in-part of Ser. No. 776,971, Oct. 15, 1991, Pat. No. 5,222,630.

[51] Int. Cl.⁵ .............................................. B65D 37/00
[52] U.S. Cl. .................................. 222/107; 222/465.1; 118/24
[58] Field of Search ......................... 222/92, 107, 465.1, 222/475, 527; 426/115; 401/261; 383/7; 118/24

[56] References Cited

U.S. PATENT DOCUMENTS

| | | | |
|---|---|---|---|
| 2,092,444 | 9/1937 | Dennery | 222/107 X |
| 2,631,563 | 3/1953 | Perry et al. | 222/465.1 X |
| 3,200,996 | 8/1965 | Picatti | 222/107 |
| 3,972,628 | 8/1976 | Stevers | 401/48 |
| 4,205,765 | 6/1980 | May | 222/107 |
| 4,872,778 | 10/1989 | Longo | 401/266 |
| 5,090,597 | 2/1992 | Johnson | 222/107 |
| 5,222,630 | 6/1993 | Burtis | 222/107 |

FOREIGN PATENT DOCUMENTS 713629  8/1954  United Kingdom ................. 222/92

Primary Examiner—Andres Kashnikow
Assistant Examiner—Anthoula Pomrening
Attorney, Agent, or Firm—Larry D. Johnson

[57] ABSTRACT

A hand-held grout-dispensing tool having a body portion defining a generally triangular envelope member made of a flexible and expandable elastic material, an open but sealable-by-folding top edge, a grip portion on one lower edge, and a spout portion enabling adjustable dispensing of grout.

9 Claims, 3 Drawing Sheets

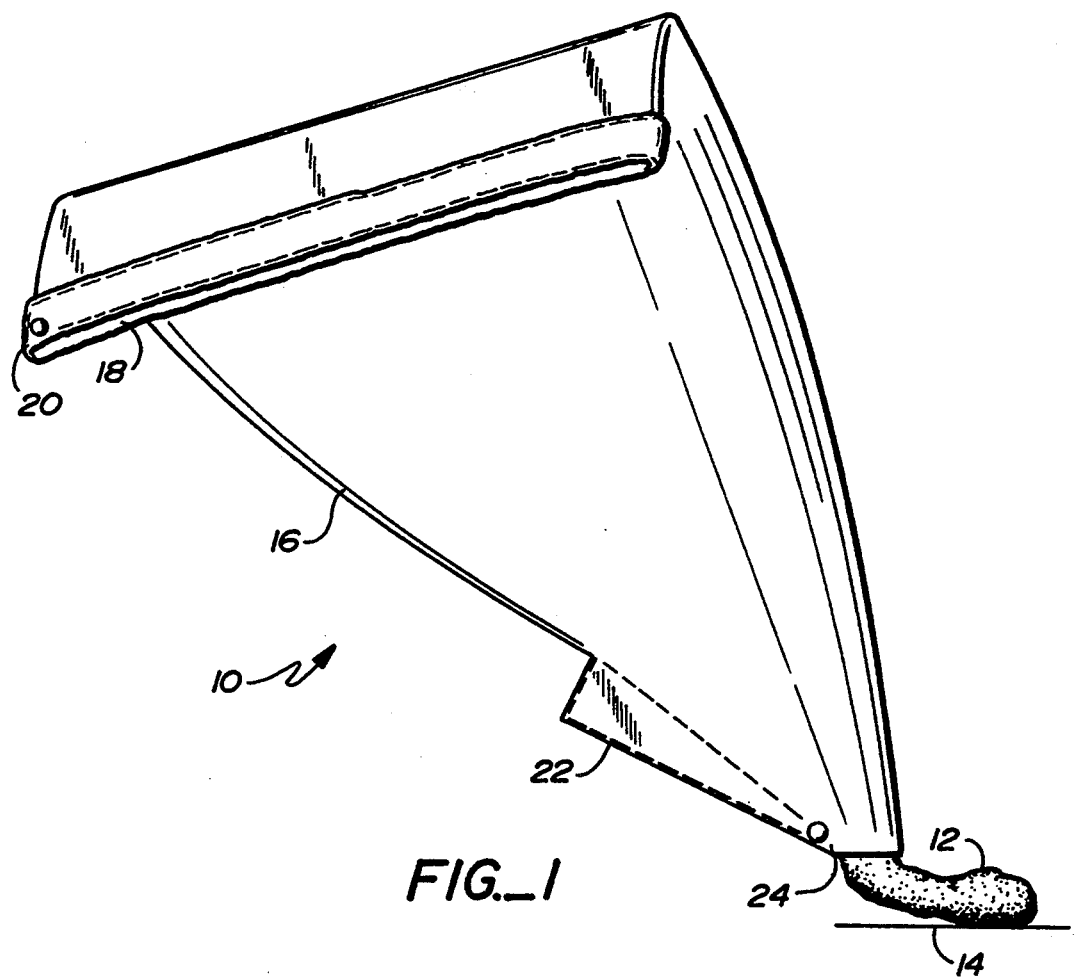
FIG._1

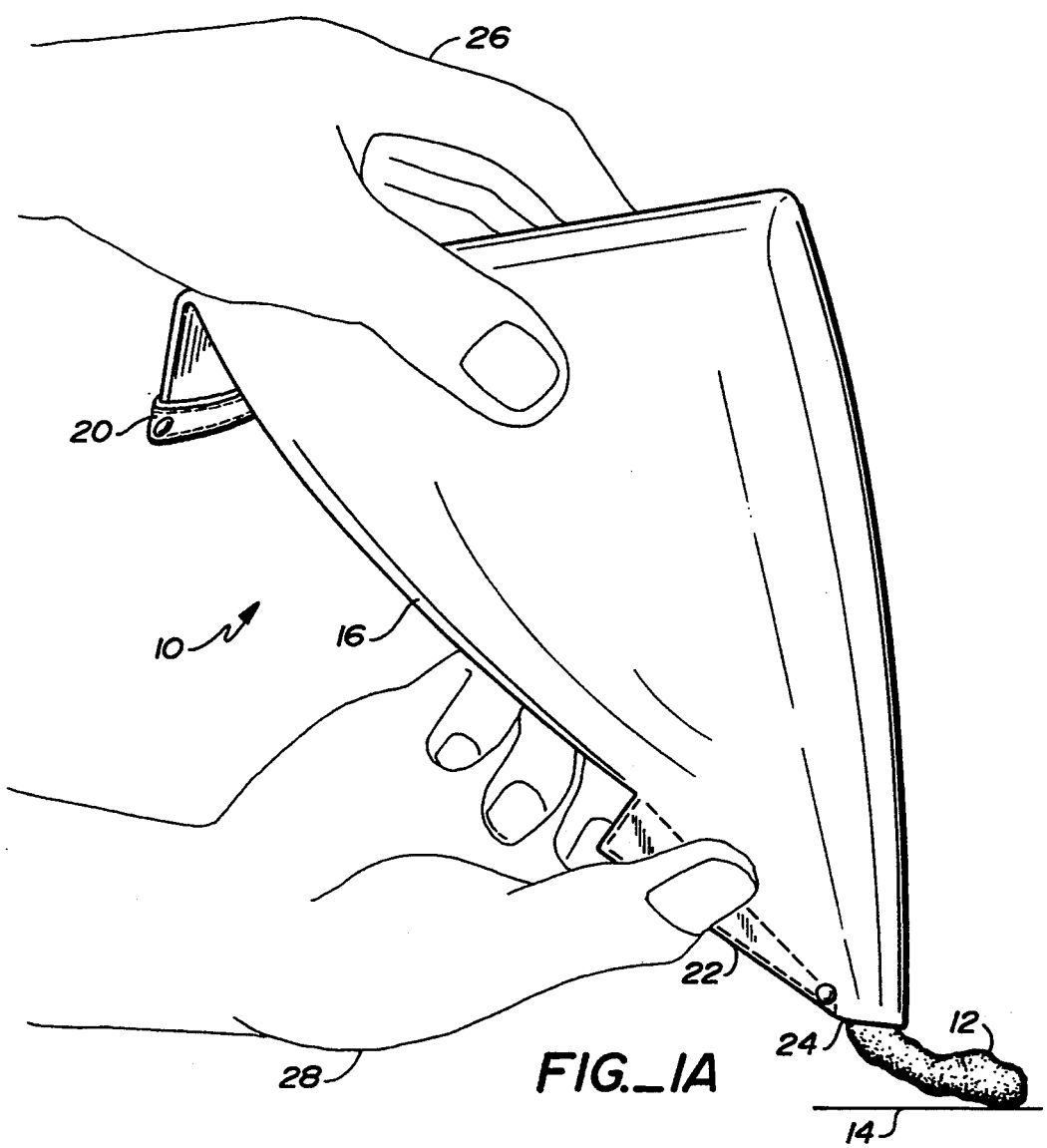
FIG._1A

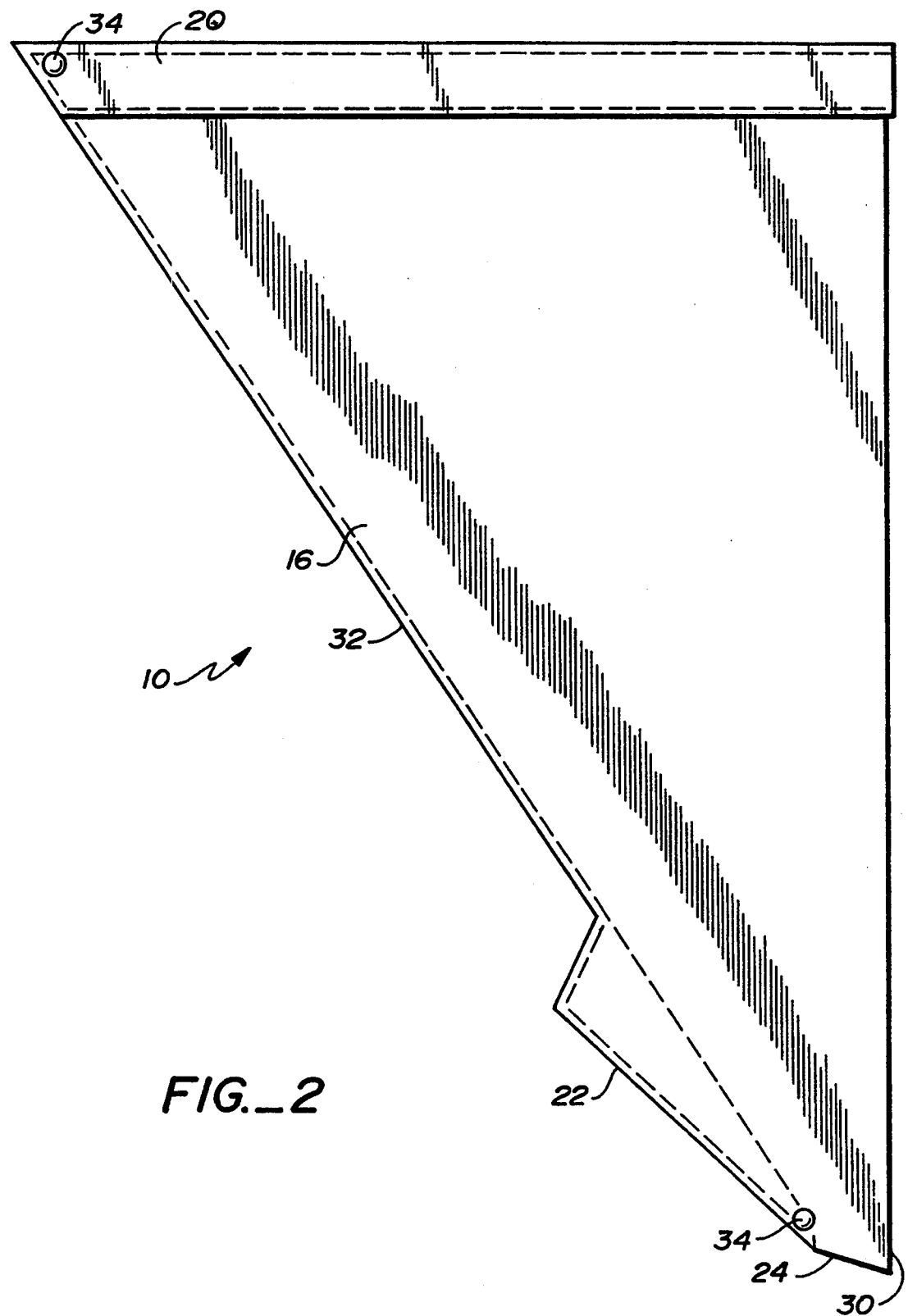
FIG._2

GROUT TOOL

This application is a continuation-in-part of co-pending patent application Ser. No. 07/776,971, filed Oct. 15, 1991, for a Grout Tool, now U.S. Pat. No. 5,222,630 issued Jun. 29, 1993.

BACKGROUND OF THE INVENTION

1. Field of the Invention

This invention relates generally to tools used with grout, cement, and related substances, and more specifically to an improved hand-held grout-dispensing tool.

2. Description of the Prior Art

Grout is a widely used construction material, and is often applied to a working surface by using a cone or funnel device which is squeezed at the top to dispense a stream of grout through a rigid spout (much like a cake decorating tool). Known grout dispensing devices are flimsy, prone to leakage, difficult to clean, and do not enable flow adjustment.

SUMMARY OF THE INVENTION

The grout tool of this invention provides an improved hand-held grout-dispensing tool having a body portion defining a generally triangular envelope member made of a flexible and expandable elastic material (capable of recovering its size and shape after deformation), an open but sealable-by-folding top edge, a hand hold or grip portion on one lower edge, and a spout portion enabling adjustable dispensing of grout.

BRIEF DESCRIPTION OF THE DRAWINGS

FIG. 1 is a perspective view of the grout tool of this invention in use and having applied a bead of grout to a working surface, illustrating the body of the tool defining a generally triangular envelope member made of a flexible and expandable elastic material; a fill opening temporarily sealed by the folding of a top edge; a hand hold or grip portion on one lower edge; and an end or spout portion at the bottom for grout dispensing; this view illustrating the elastic envelope member in its expanded configuration;

FIG. 1A is a further perspective view of the grout tool of this invention in use and having applied a bead of grout to a working surface, illustrating the preferred placement of the user's two hands on the folded top edge and grip portions of the grout tool, respectively, this view also illustrating the elastic envelope member in its expanded configuration; and FIG. 2 is a side elevation view of the grout tool of this invention illustrating the generally triangular envelope member in its unfolded, empty and flattened configuration; this view illustrating the elastic envelope member in its retracted configuration and having recovered its original size and shape after deformation.

DETAILED DESCRIPTION OF A PREFERRED EMBODIMENT

FIG. 1 is a perspective view of the grout tool 10 of this invention in use and having applied a bead of grout 12 to a working surface 14, illustrating the body of the tool defining a generally triangular envelope member 16 made of a flexible and elastic material; a fill opening 18 temporarily sealed by the folding of a reinforced top edge 20; a hand hold or grip portion 22 on one lower edge; and a tapered, flexible end or spout portion 24 at the bottom for grout dispensing. This view illustrates the elastic envelope member 16 in its expanded (stretched) configuration, at least partially filled with grout material.

The advantages of the reinforced (e.g., double folded) top edge 20 include:

1. The fill opening 18 stays open easily to allow simple filling of the tool with grout;

2. Once closed and folded (as illustrated), grout seepage in the fill opening area is avoided;

3. The linear top edge applies even pressure to the grout for a more even flow of grout through the spout; and 4. This configuration evenly pushes grout off the inner surfaces of the envelope.

Alternatively, the top edge may not be double-folded or reinforced in any way, but rather simply be defined as the openable end of the envelope member.

The advantages of the hand hold or grip portion 22 configuration include:

1. The grip easily rests in the palm of the user's hands to enable adjustment of grout flow from the spout by the user's thumb and fingers;

2. The grip can alternatively be held between thumb and fingers for non-restrictive flow of grout through the spout; and 3. The grip can also be folded flat against either side of the grout tool to enable extra flow pressure at the grout spout and streamline the grout dispensing end of the grout tool.

Alternatively, the grip portion may simply consist of the natural shape of the envelope proximate the spout, without a specific contiguous extension of the material from the second edge. In this version, the second edge would simply rest in the user's hand.

The advantages of the tapered, flexible spout portion 24 include:

1. The flexibility of the spout portion enables regulation of the grout flow by adjustment with the user's thumb and index finger; and 2. The spout portion is tapered to reduce spillage and allow flow adjustment.

Alternatively, the spout portion may simply be untapered (straight), and/or inflexible (rigid).

FIG. 1A is a further perspective view of the grout tool 10 of this invention in use and having applied a bead of grout 12 to a working surface 14, illustrating the preferred placement of the user's two hands 26, 28 on the folded reinforced top edge 20 and grip portions 22 of the grout tool, respectively. Manual pressure by hand 26 on top edge 20 exerts pressure on the grout mixture inside the envelope 16, forcing it out through spout 24. Selective placement of hand 28 on grip 22 or proximate flexible spout 24 determines flow rate, thickness, and the like. This view also illustrates the elastic envelope member 16 in its expanded (stretched) configuration, at least partially filled with grout material.

FIG. 2 is a side elevation view of the grout tool 10 of this invention illustrating the generally triangular envelope member 16 in its unfolded, empty and flattened configuration. In the preferred embodiment, envelope 16 is made of neoprene or other suitably elastic, strong, flexible, waterproof material. The envelope material should also preferably be non-adhering to grout mixtures, either during their initial fluid or eventual solidified states. Neoprene is especially appropriate due to its inherent "slipperiness" when filled with grout or like substances. This view illustrates the elastic envelope member in its retracted configuration, having recovered its original size and shape after deformation.

The envelope can be manufactured from a single piece of material, folded along edge 30 and stitched with nylon thread to form edge 32 and grip 22. Reinforced top edge 20 can be formed by similar folding and stitching techniques. Fasteners 34 may be installed between the top edge 20 and edge 32, and between grip 22 and spout 24, to further strengthen the construction. While the envelope can of course be made in any size, suitable dimensions are as follows: approximately sixteen inches overall length (along edge 30), and twelve inches wide (along reinforced top edge 20). Grip 22 may be a contiguous extension of material measuring four and three-quarters inches by one and three-eighths inches, and the reinforcement of top edge 20 may consist of a one inch fold, each stitched and fastened as appropriate. Spout 24 may be one inch wide, tapered from edge 30 to edge 32 by approximately one-quarter inch. The junction of edge 30 with top edge 20 may, but does not necessarily, define a right angle.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A tool for dispensing a grout material to a working surface, said tool comprising;
a body portion defining a generally triangular envelope member made of a flexible and expandable elastic material, said envelope member having a first edge, a second edge, and a third edge, said first edge providing an open top sealable by folding said first edge, said second edge including a grip portion of a size to be grasped by a user's hand, said envelope member further having a spout portion at the junction of said second edge and said third edge proximate said grip portion, said spout portion enabling manual regulation of grout dispensing to said working surface.

2. The grout tool of claim 1 wherein said envelope member is made from a single sheet of material, and said first edge comprises two double-folded edges of said material.

3. The grout tool of claim 1 wherein said envelope member is made from a single sheet of material, and said grip portion comprises a contiguous extension of said material from said second edge.

4. The grout tool of claim 1 wherein said envelope member is made from a single sheet of material folded once to define said third edge, and sealed to define said second edge, and said spout portion comprises a flexible opening between said second edge and said third edge.

5. The grout tool of claim 1 wherein said spout portion is tapered.

6. The grout tool of claim 1 wherein said envelope member is made of neoprene.

7. The grout tool of claim 1 wherein said envelope member is made of a single sheet of neoprene that has been folded once to define said third edge, stitched to define said second edge, and folded over and stitched to define said first edge.

8. The grout tool of claim 1 including a reinforcing fastener between said first edge and said second edge, and between said grip portion and said spout portion.

9. The grout tool of claim 1 wherein said first edge and said third edge meet at a right angle.

* * * * *